June 3, 1924.

F. P. BRAINERD ET AL

COMBINED TIRE CARRIER AND RIM CONTRACTOR

Filed Oct. 24, 1922    3 Sheets-Sheet 1

1,496,082

F. P. Brainerd
A. E. Pottman,
INVENTOR.

WITNESSES

BY
ATTORNEYS.

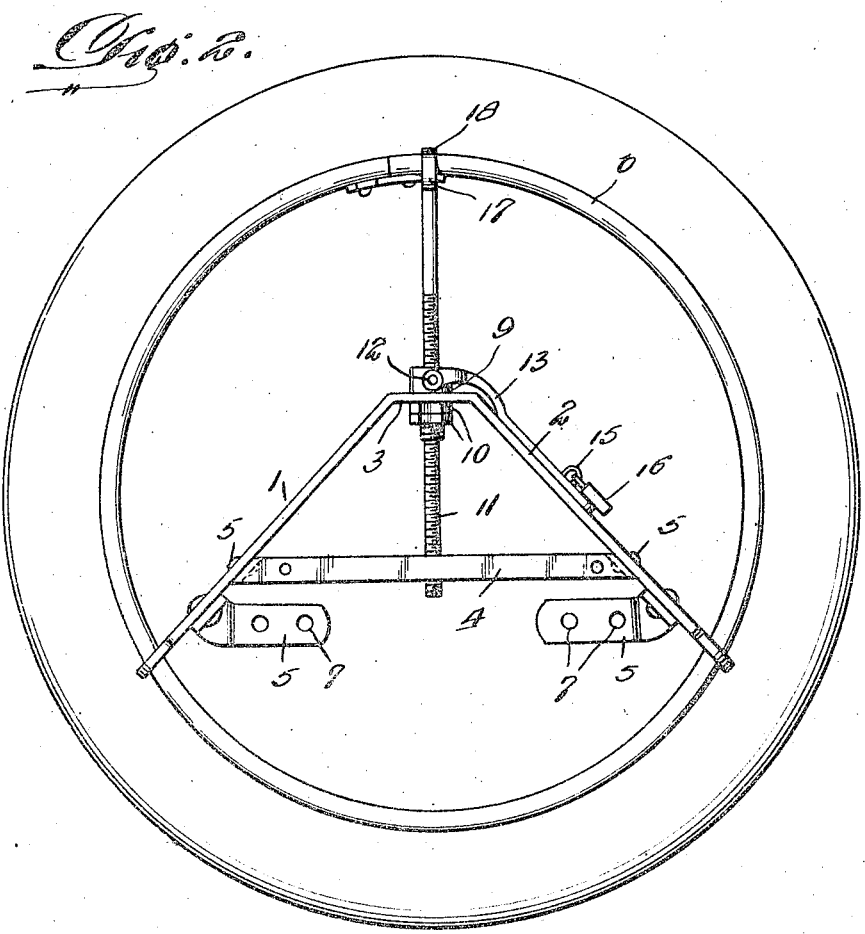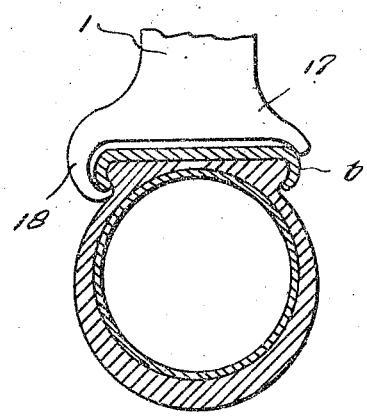

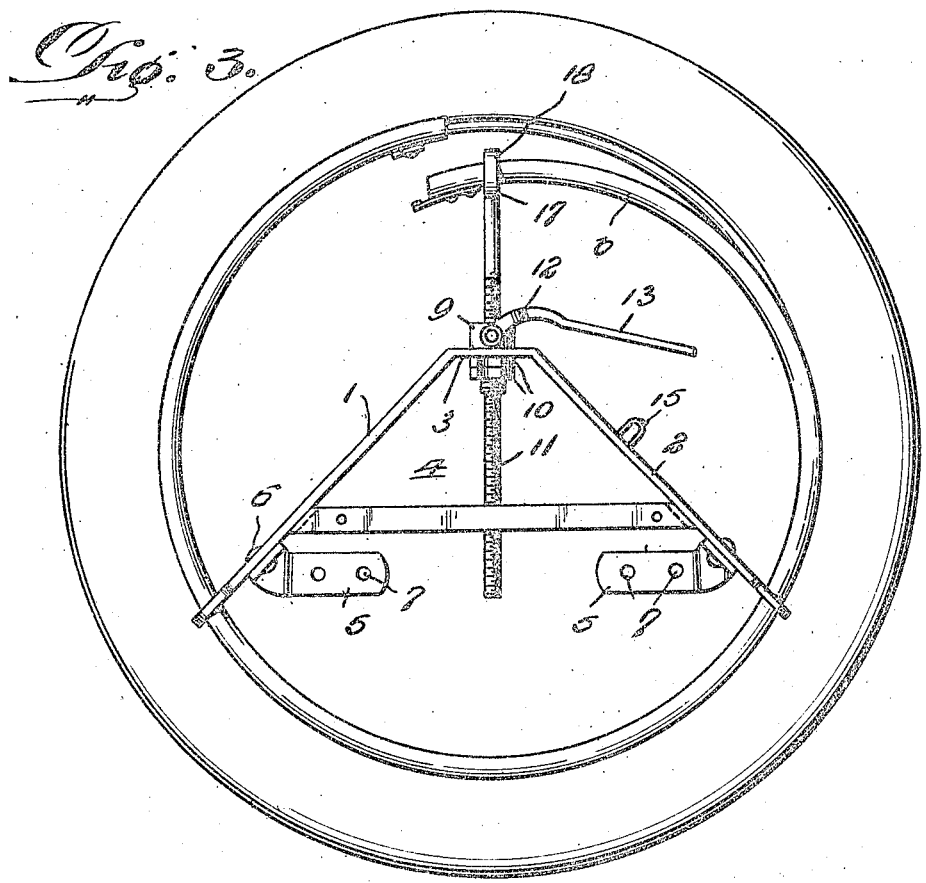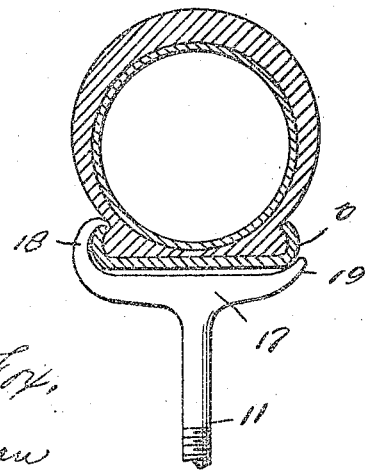

Patented June 3, 1924.

1,496,082

UNITED STATES PATENT OFFICE.

FRANK P. BRAINERD AND ADAM E. POLLMAN, OF GAYS MILLS, WISCONSIN.

COMBINED TIRE CARRIER AND RIM CONTRACTOR.

Application filed October 24, 1922. Serial No. 596,683.

*To all whom it may concern:*

Be it known that we, FRANK P. BRAINERD and ADAM E. POLLMAN, citizens of the United States, residing at Gays Mills, in the county of Crawford and State of Wisconsin, have invented certain new and useful Improvements in Combined Tire Carriers and Rim Contractors, of which the following is a specification.

The present invention relates to new and useful improvements in combined tire carriers and rim contractors and the primary object thereof resides in the provision of such a device that is simple of construction, inexpensive of manufacture, easy of operation, and highly useful of purpose.

With these general objects in view and others that will appear as the nature of the invention is better understood, the same consists in the novel construction, combination and arrangement of parts hereinafter more fully described, illustrated in the accompanying drawings, and pointed out in the appended claim.

In the drawings forming a part of this application, and in which like designating characters refer to corresponding parts throughout the several views:

Figure 2 is an enlarged rear elevational view of the device shown in Figure 1, the same being shown as removed from the vehicle body.

Figure 3 is a view similar to Figures 1 and 2, the device being shown as employed as a rim contractor.

Figures 5 and 6 are enlarged side elevational views of one of the rim engaging legs, and the movable operating bar respectively, the same being shown as in engagement with a pneumatic tire rim, the tire and rim being shown in cross section.

Figure 1:
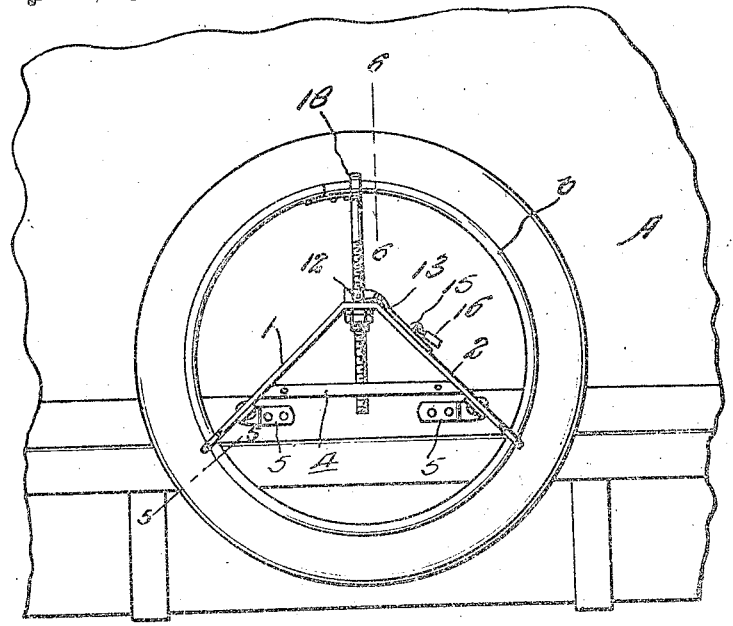
Figure 1 is a rear elevational view of the device constructed in accordance with the present invention, the same being shown as secured at a convenient point upon a vehicle body, and also showing the same as having a tire supported thereon.
Figure 4:
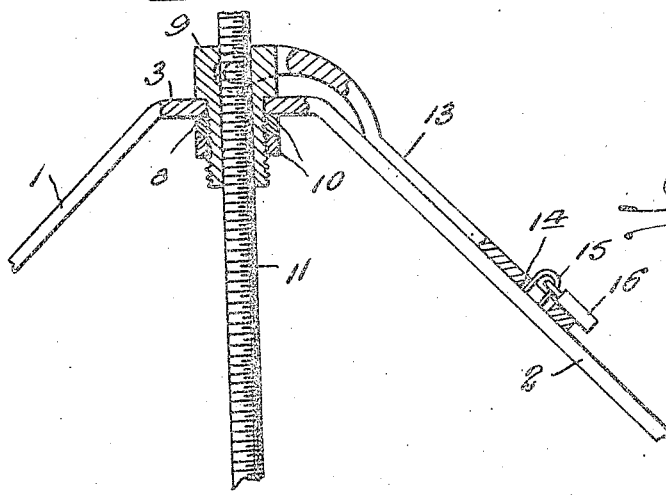
Figure 4 is a fragmentary enlarged sectional view of a portion of the device.

With particular reference to the drawings, our device includes a pair of suitably spaced oppositely inclined flat-like leg members 1 and 2 joined at their upper ends by an integral cross plate or web 3. Substantially intermediate the ends of the side legs 1 and 2, there is a cross brace 4 secured to these legs by rivets or the like 5, and as a means for positioning the device upon the rear of a car A, each of the legs 1 and 2 having an angular bracket 5' secured thereto as at 6, these brackets adapted to be secured to the body A by bolts passing through perforations 7 in each of the bracket members.

The connecting web or plate 3 for the legs 1 and 2 is centrally perforated as at 8 for receiving a headed bushing 9 therethrough, this bushing adapted to be retained within the central perforation of the web 3 by the nuts 10, the lower end of this bushing being screw threaded as shown. This bushing is internally screw threaded, and is adapted to receive therethrough an annular screw threaded rod 11, and pivotally secured to the headed end of the bushing 9 is the yoked end 12 of an operating lever 13, this lever being adapted for rotating the bushing 9, and consequently imparting a reciprocatory movement to the screw threaded rod 11. Adjacent the outer end of the rod 11, the same is provided with a slot 14 therein adapted to engage over a hasp 15 carried by the adjacent leg 2, this hasp 15 positioned for the reception of the figure of a pad lock 16, whereby the said operating lever 13 is locked.

The rim engaging ends of the legs 1 and 2 and the screw threaded rod 11 are enlarged as at 17 for engagement beneath the width of a tire rim "b." The outer end of each of these enlarged portions of the legs 1 and 2 and bar 11 are hooked as at 18 for engagement upon the adjacent curved side flange of the rim "b." The opposite ends of each of the enlarged portions 17 are slightly curved upward as at 19 for engaging a portion of the oppositely curved flange of the said rim.

In view of the above description, it will be readily understood that by rotating the lever 13, the bushing 9 will be simultaneously rotated within the connecting web 3 for imparting a reciprocatory movement to the screw threaded rod 11, and when this rod is moved downwardly, a sufficient distance with respect to the legs 1 and 2, a tire rim may be supported upon the legs and rod to be there secured by upward movement of the rod within its bearing, the upward movement of this rod occasioning a wedge-like action between the enlarged ends 17 of the legs 1 and 2, the rod 11 and the inner face of the rim "b." In employing the device as a rim contractor as shown in Figure 3, the operating lever 13 is rotated in a direction to draw the rod 11 downwardly, thereby contracting the rim as shown in this figure. When it is desired to remove the tire from the support, the operating lever 13 is so rotated as to extend the hooked end of the rod 11 above the rim at which time, this hooked end may be swung out of engagement with the rim for allowing the rod to be drawn downwardly, at which time, the tire may be removed.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim as new is:—

A combined tire carrier and rim contractor comprising a substantially V-shaped member provided at its ends with rim engaging means, means for attaching the end portions of said member to a support, a sleeve journaled at the intermediate portion of said V-shaped member and passing transversely through the member, a rod threaded through said sleeve and provided at its end with rim engaging means, a handle pivoted upon the sleeve and having angularly disposed end portions whereby the said handle may be swung down in close proximity with the exterior surface of one of the side portions of the V-shaped member, means for locking the handle against the V-shaped member, the handle adapted to be swung so that its outer portion may be disposed approximately at a right angle to the axis of the rod whereby the handle may serve as a lever for rotating the sleeve in the V-shaped member, and for moving the rod longitudinally through the sleeve.

In testimony whereof we affix our signatures.

FRANK P. BRAINERD.
ADAM E. POLLMAN.